Nov. 28, 1944.　　　　C. O. COOK　　　　2,363,643
STEREOSCOPIC PLOTTING INSTRUMENT
Filed March 28, 1942　　　10 Sheets-Sheet 7

INVENTOR
C. O. COOK
ATTORNEYS

Nov. 28, 1944.　　　　　C. O. COOK　　　　　2,363,643
STEREOSCOPIC PLOTTING INSTRUMENT
Filed March 28, 1942　　　10 Sheets-Sheet 8

INVENTOR
C. O. COOK

BY

ATTORNEYS

Nov. 28, 1944.  C. O. COOK  2,363,643
STEREOSCOPIC PLOTTING INSTRUMENT
Filed March 28, 1942  10 Sheets-Sheet 10

INVENTOR
C. O. COOK
ATTORNEYS

Patented Nov. 28, 1944

2,363,643

UNITED STATES PATENT OFFICE 2,363,643

STEREOSCOPIC PLOTTING INSTRUMENT

Charles O. Cook, Takoma Park, Md.

Application March 28, 1942, Serial No. 436,697

7 Claims. (Cl. 88—29)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the art of delineating and compiling maps from aerial photographs having stereoscopic overlaps.

In general, this invention comprises an instrument by means of which a pair of aerial photographs having a stereoscopic overlap can be viewed stereoscopically simultaneously with a mapping surface upon which the map is to be produced, so that an index mark which can also be viewed simultaneously and which is attached to a tracing device in contact with the mapping surface can be moved to follow along lines of the model which are delineated on the mapping surface by the tracing device.

The following description, considered together with the accompanying drawings, will disclose this invention more fully, its objects and advantages, so that a complete understanding may be had by those skilled in the art.

Referring with more particularity to the drawings, in which like numerals designate like parts, the embodiment illustrated in Figures 1 to 12 comprises a suitable frame 30 which is normally supported on a mapping surface 31 by means of elevationally adjustable legs 32. These adjustable legs permit a leveling of the instrument over the mapping surface, for which purpose bubble levels 33 and 34 are fixed to the frame.

On top of the instrument there is mounted the optical system, which includes a stereoscope for viewing photographs having a stereoscopic overlap. This optical system in contained in housings 35 and 36 and comprises eye-pieces 37 and 38 and eye-piece mirrors 39 and 40, respectively, facing outwardly and upwardly at an angle of about 45°. These eye-pieces and their corresponding eye-piece mirrors are mounted in longitudinally movable frames 41 and 42. Each of these frames carries a housing 43 consisting of a top portion 44 and end walls 45 and 46 which carry horizontal flanges 47 and 48, the ends of which are slidable in longitudinal grooves 49 and 50 of supporting members 51 and 52 secured to the frame of the instrument. Within the housing 43 the eye-piece mirror is disposed. Guides 53 and 54 extend from the flanges 47 and 48 in the grooves 49 and 50 to stabilize the movement of the frame. The top portion 44 is integral with the barrel 57 of the eye-piece which contains a lens 58. The barrels of both the eye-pieces are disposed through longitudinal slots 60 and 61 of the housings 35 and 36, respectively, to permit adjusting movements which are necessary in order to accommodate the eye-span of different individuals. The eye-piece mirrors 39 and 40 are disposed below their respective eye-piece lenses. Each of these mirrors is adjustably mounted between three springs 62 on one side and three abutment screws 65 on the other side. Within the housings 35 and 36 there are secured wing mirrors 68 and 69, respectively, parallel to and facing the mirrors 39 and 40, respectively. However, parallelism between these corresponding mirrors is accomplished by adjusting the mirrors 39 and 40 with the abutment screws 65.

The frames 41 and 42 are provided with longitudinal racks 70 and 71 which engage pinions 72 and 73 fixed to shafts 74 and 75. These shafts are rotatably mounted through the housings 35 and 36 and on the exterior are provided with knobs 76 and 77 to permit rotating the shafts and pinions manually, so as to move the frames 41 and 42 independently in the grooves 49 and 50. Each of the frames 41 and 42 is provided with a reference mark 78 which moves adjacent a scale 79 on the supporting member 51.

Figure 1:
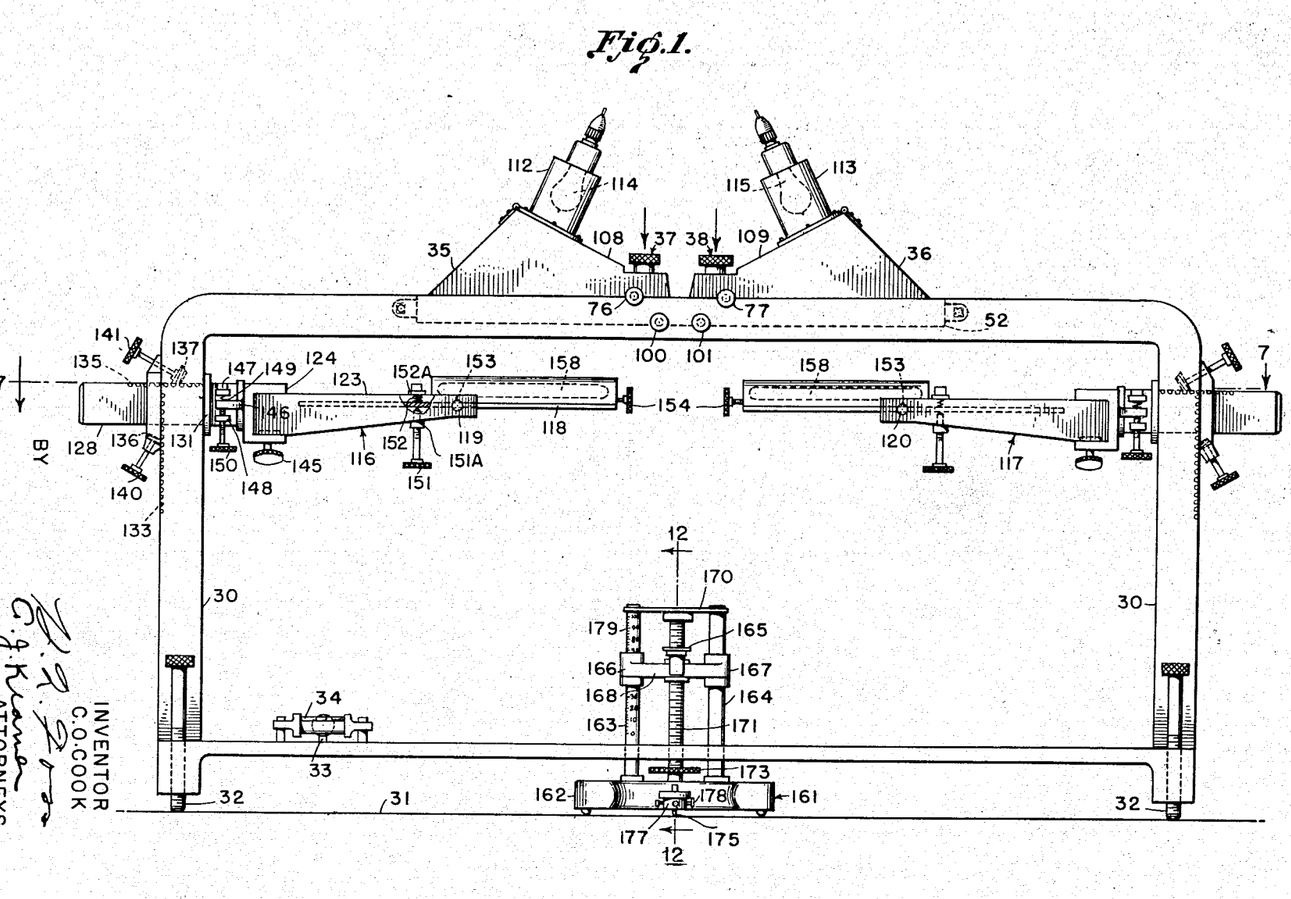
Figure 1 is a front elevational view of one of the preferred embodiments of this invention.
Figures 2, 13, 15:
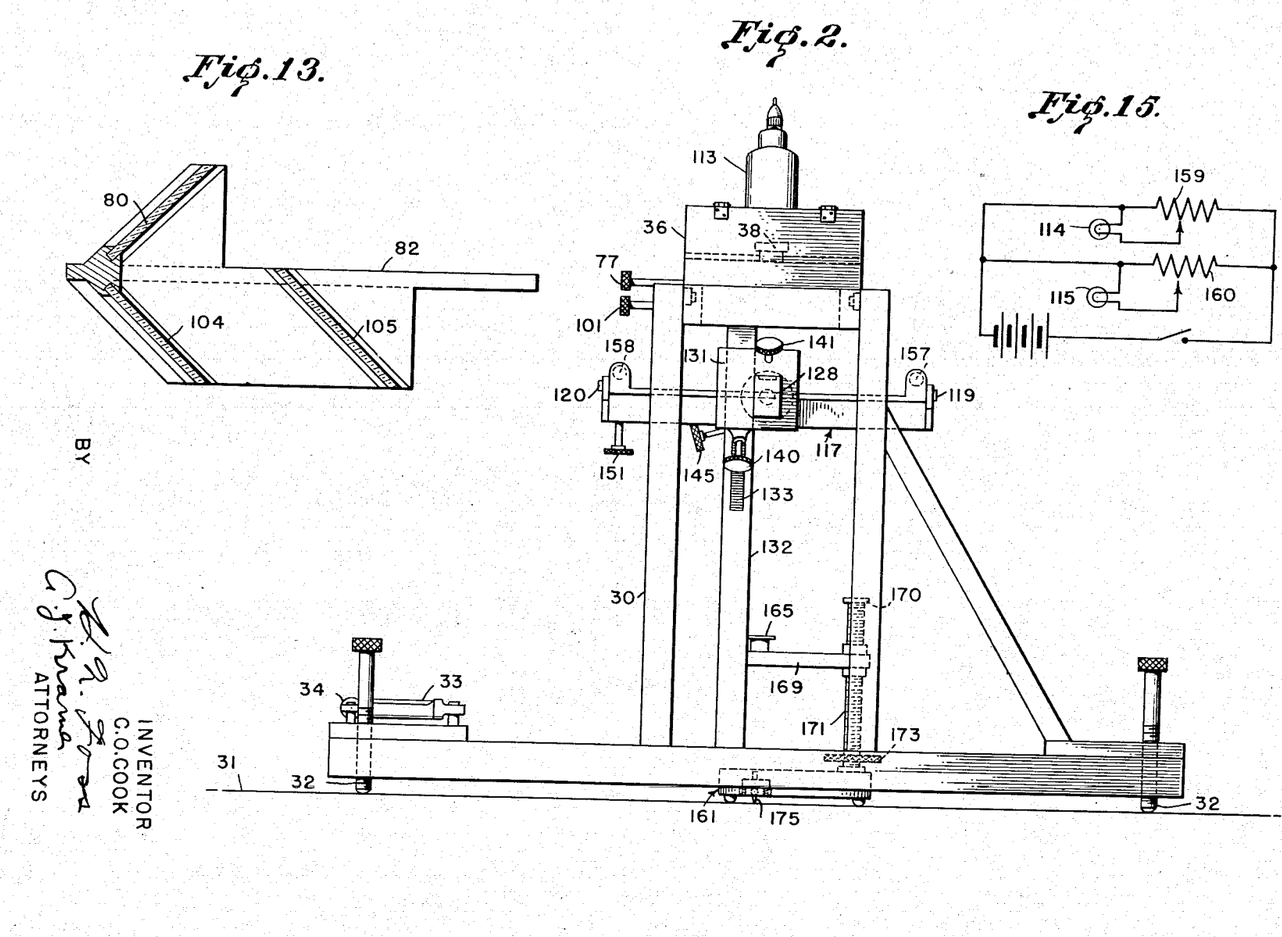
Figure 2 is a side elevational view of the embodiment illustrated in Figure 1.
Figure 13 is a vertical section of a frame carrying a modified arrangement of mirrors in the optical system.
Figure 15 is a wiring diagram for the incandescent lamps.
Figure 3:
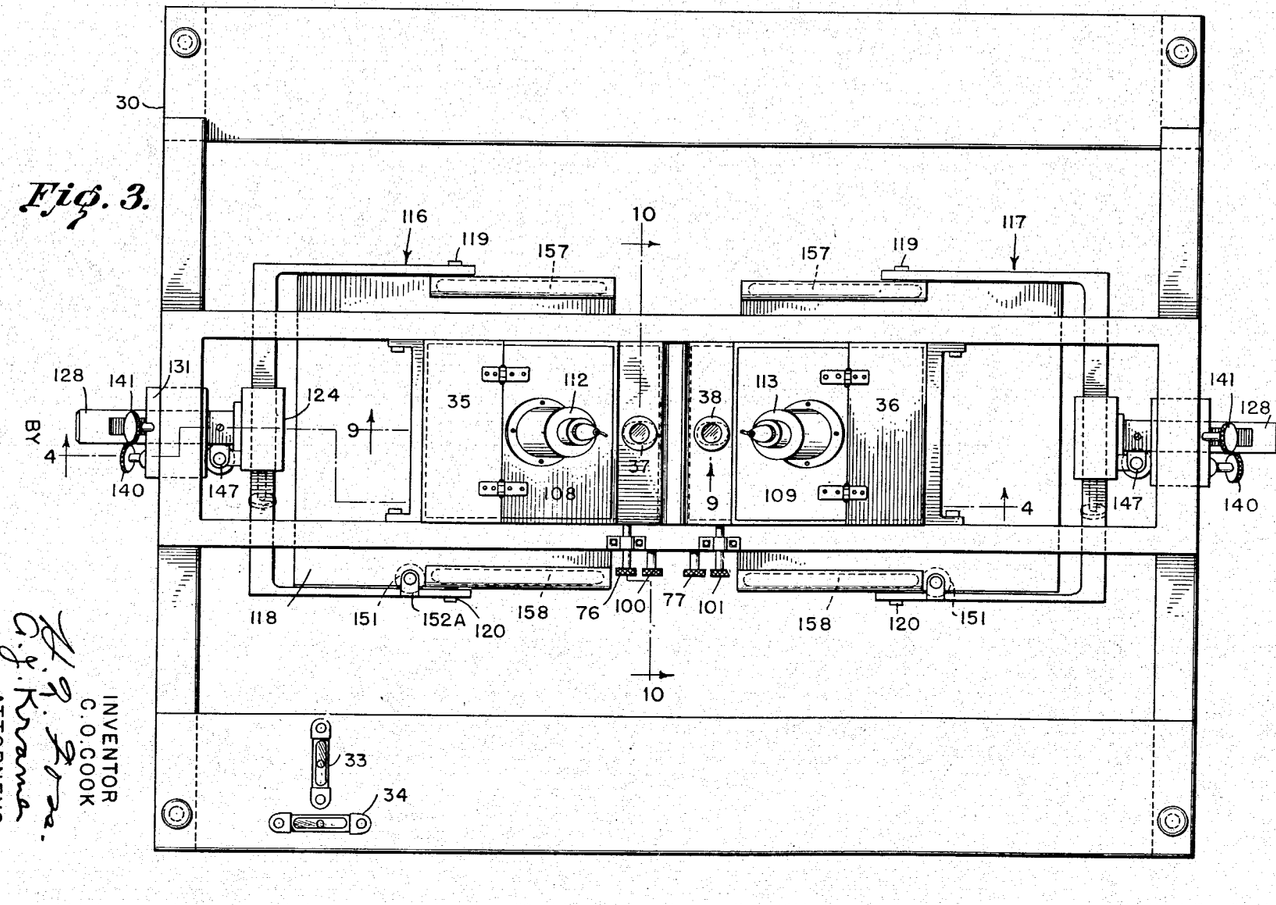
Figure 3 is a plan view of the same embodiment.
Figures 4, 5, 6:
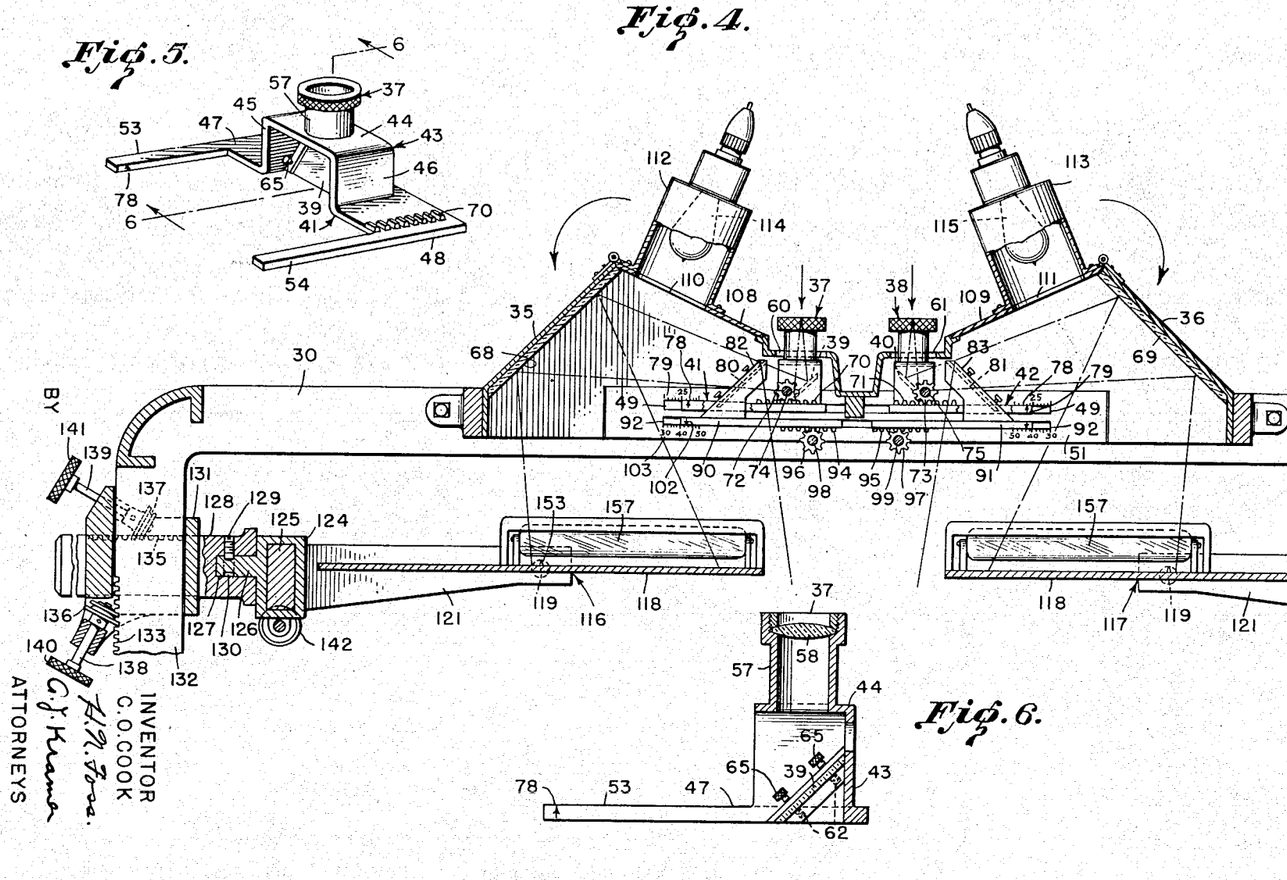
Figure 4 is a fragmentary section along the line 4—4 of Figure 3.
Figure 5 is an isometric view of the left eye-piece frame.
Figure 6 is a section along the line 6—6 of Figure 5.
Figure 7:
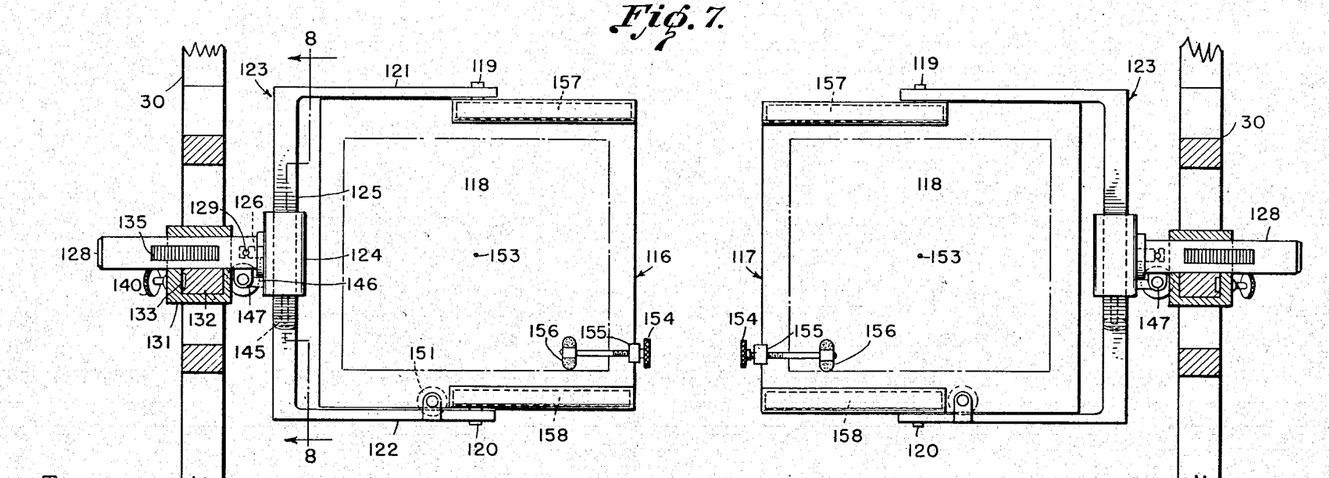
Figure 7 is a partial plan section along the line 7—7 of Figure 1.
Figure 8:
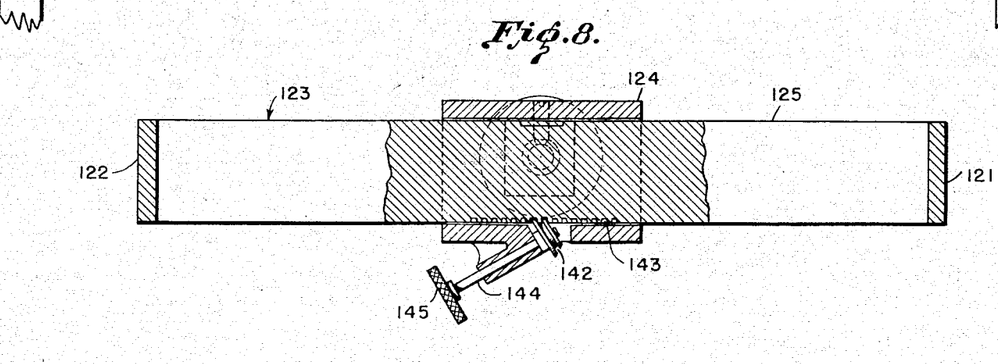
Figure 8 is a section along the line 8—8 of Figure 7.

Between the mirrors 39 and 40 and 68 and 69, other mirrors 80 and 81 are disposed on movable frames 82 and 83. These other mirrors, however, are half-silvered or semi-transparent with the reflecting surface of each facing and being parallel to its corresponding eye-piece mirror. The mirrors 80 and 81 are mounted on their frames between three springs 84 and three abutment screws 87 to permit the making of adjustments. These frames are supported on bases 90 and 91 slidably disposed in grooves 92 and 93, which grooves are below and parallel to the grooves 49 and 50, in the members 51 and 52. Longitudinal racks 94 and 95 are secured to the underside of the bases 90 and 91, which racks engage pinions 96 and 97 secured to shafts 98 and 99, said shafts being rotatably mounted through the housings 35 and 36. The other ends of the shafts 98 and 99 are provided with knobs 100 and 101 to facilitate rotation manually. Each of the bases 90 and 91 is provided with a reference mark 102 adjacent a scale 103 on the supporting member 51. Should it be desired to shift the field of view of the mirrors 80 and 81 closer to the center of the instrument, this part of the instrument may be modified as shown in Figure 13 by securing sets of parallel mirrors 104 and 105 perpendicular to the mirror 80, and a similar set of mirrors parallel to the mirror 81, on frames such as the frame 82 beneath the mirrors 80 and 81, substantially as illustrated. The housings 35 and 36 are provided with hinged tops 108 and 109 having apertures 110 and 111 over which there are mounted tubular housings 112 and 113 for incandescent lamps 114 and 115, the function of which will be hereinafter explained.

Beneath the housings 35 and 36 phototables 116 and 117 are disposed, each comprising a platen 118 pivoted on trunnions 119 and 120 between the parallel arms 121 and 122 of a horizontal U-frame 123. The frame 123 is supported by means of a sleeve bracket 124 slidably engaging the cross arm 125 of non-circular cross-section of the frame 123. The bracket 124 is integral with a horizontal stub shaft 126 at right angles to the cross arm 125 which is rotatably set in a bearing 127 on the end of a bar 128. The shaft 126 is held in the bearing 127 by means of a pin 129 engaging a concentric groove 130 of the said shaft. The bar 128 is of a non-circular cross-section and is longitudinally slidable through another sleeve bracket 131 mounted for vertical movement on an upright 132 comprising one of the structural members of the frame of the instrument. The various movements permitted by this arrangement may be controlled by any suitable means. The means illustrated comprise a vertical rack 133 on the upright 132 and a horizontal rack 135 on the bar 128 engaging conical worms 136 and 137, respectively, which are rotatably mounted on the bracket 131 by means of shafts 138 and 139. Knobs 140 and 141 are secured to the shafts 138 and 139 for imparting rotation manually. This provides for control of vertical motion and longitudinal horizontal motion. Lateral horizontal motion is controlled by means of a conical worm 142 engaging a rack 143 secured to the cross arm 125. The pinion 142 is secured to the end of shaft 144 rotatably mounted on the bracket 124, which shaft is provided with a thumb grip 145.

Rotatable motion about or parallel to the longitudinal axis is controlled by means of an ear 146 projecting from the bracket 124 between two shoulders 147 and 148 extending from the bar 128. Between the ear 146 and the shoulder 147 a spring 149 is mounted in compression, while a thumb screw 150 on the shoulder 148 abuts the ear 146 against the force of the spring 149. Consequently, by turning the thumb screw 150 the whole phototable pivots about the bar 128, either against or under the action of the spring 149, as the case may be. Pivotal movement of the platen 118 on the trunnions 119 and 120 is similarly accomplished by means of a thumb screw 151 on an ear 151A extending from the U-frame 123 beneath the platen. Said screw abuts the under side of the platen against the force of a compressed spring 152 between the top of the platen and an ear 152A extending from the frame above the platen. A short upright pin 153 is secured to the center of each platen 118 to engage pivotally the centers of photographic prints. The prints are pivotally moved about these pins by means of a thumb screw 154 rotatably disposed in a non-radial direction on a bracket 155 fixed to the platen. The inner end of the thumb screw 154 is provided with a friction pad 156 of any suitable material, such as sponge rubber, to engage the surface of photographs placed on the platen. By these means photographs placed on the platens can be tilted, tipped, swung, and moved in three coordinate directions.

Photographs placed on the platens 118 are illuminated by fluorescent lamps 157 and 158 or by the incandescent lamps 114 and 115, or both. In order to compensate for a difference in density or tone between pairs of photographs, the intensity of light from the incandescent lamps is made independently adjustable by means of rheostats 159 and 160, as illustrated in the wiring diagram (see Figure 15).

Figures 9, 14:
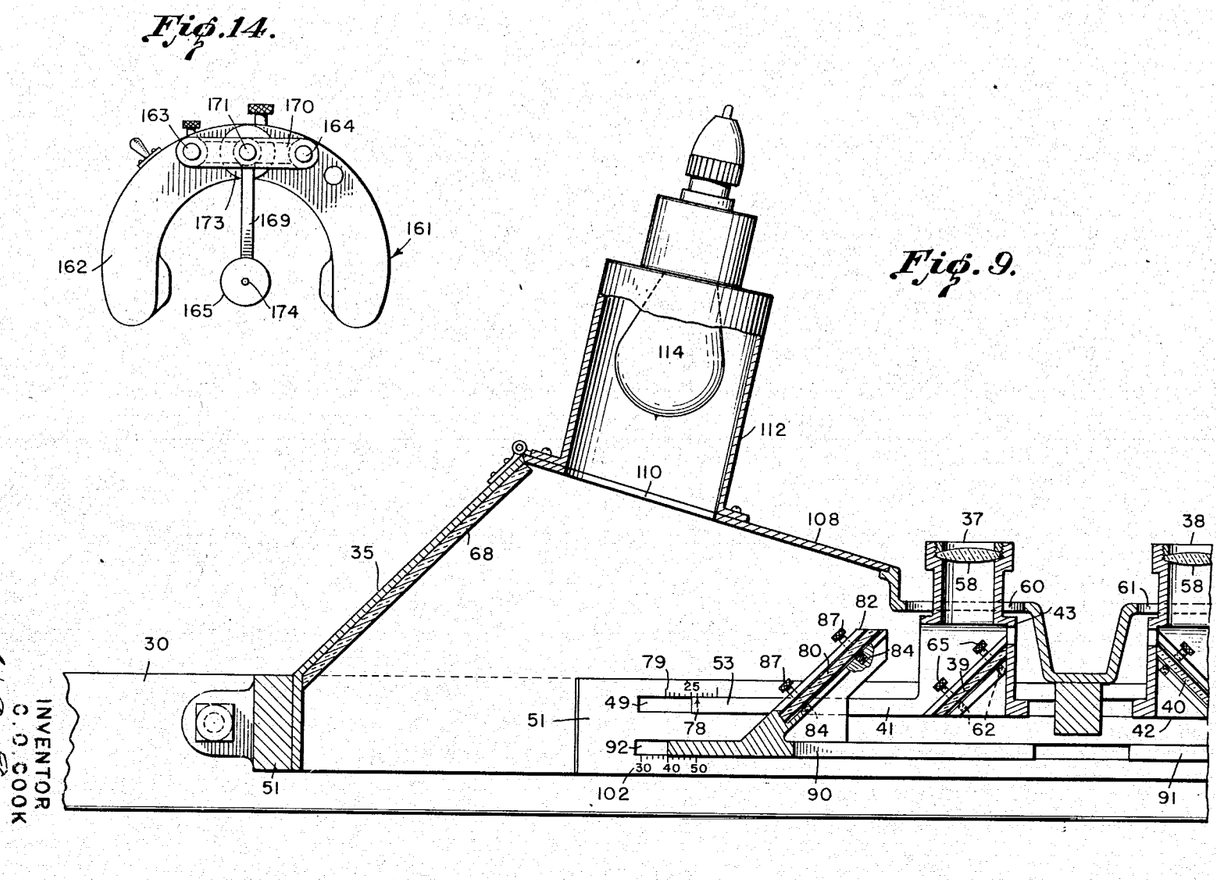
Figure 9 is an enlarged section along the line 9—9 of Figure 3.
Figure 14 is a plan view of the tracing stand.
Figures 10, 11:
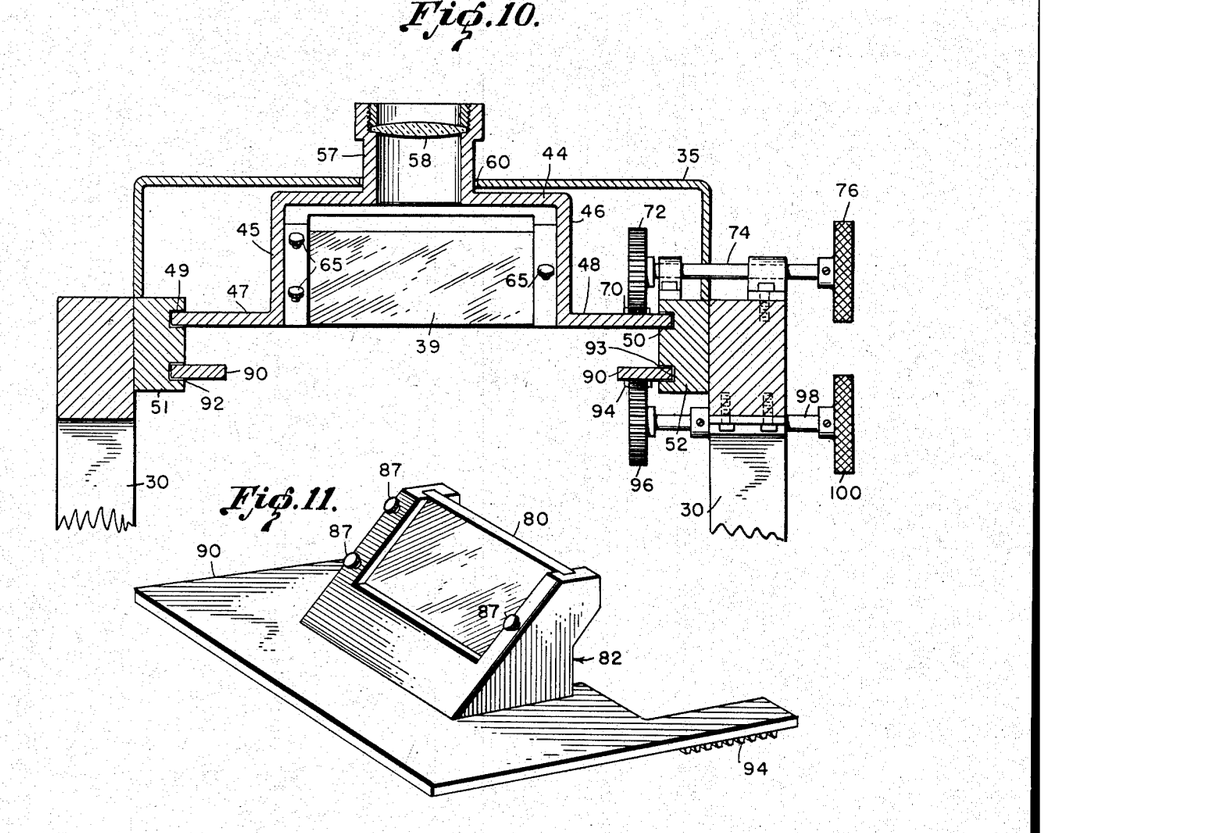
Figure 10 is a section along the line 10—10 of Figure 3.
Figure 11 is an isometric view of the mounting for the left semi-transparent mirror.
Figure 12:
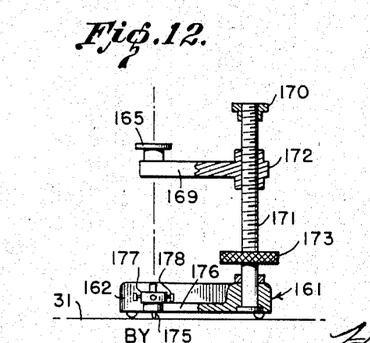
Figure 12 is a vertical section of the tracing stand along the line 12—12 of Figure 1.

Complementary to the parts described above is a tracing stand 161, similar to that employed with the conventional multiplex aero-projector (see Engineering Applications of Aerial and Terrestrial Photogrammetry (1938) by B. B. Talley, page 228), which comprises a U-shaped base 162 adapted to be moved independently over the mapping surface 31, upon which the instrument is supported. Uprights 163 and 164 are secured to the base 162, upon which a horizontal opaque ledge or disc 165 is supported for vertical movement by means of sleeves 166 and 167 connected by a bar 168 slidable on said uprights and attached to said disc by an arm 169. The uprights 163 and 164 are connected at the top by a brace 170, and the ledge 165 is moved on said uprights by means of a vertical micrometer screw 171 pivotally supported between said brace and the base 162. The screw 171 is threadedly engaged with a boss 172 fixed to the bar 168, and rotation of the screw is accomplished manually by means of a thumb grip 173. The ledge 165 is provided on top with a reference mark 174 which is commonly referred to as the floating mark. It is well known that this mark may be either a mechanical configuration such as a V, X, or a point source of light shining through a pinhole in the center of the ledge. Directly beneath this mark there is secured to the base 162 a pencil 175, or other tracing implement, by means of a rigid arm 176 and a holder 177. The point of the pencil is adapted to rest on the mapping surface 31, and its position is adjusted thereto by means of set screws 178 on the said holder. One of the uprights is provided with a vertical scale 179 for indicating relative positions of the ledge.

The instrument is operated as follows:

A pair of vertical photographs or prints having a stereoscopic overlap is mounted on the platens 118 with the center of each print over the center of each platen beneath the friction pads 156. The prints are held in this position by forcing the pins 153 through their centers. The prints are viewed through the eye-pieces 37 and 38 and swung into stereoscopic correspondence by turning the thumb screws 154 and adjusting the position of the prints with respect to the field of view of the stereoscope by means of the other adjustments provided. The observer, in looking through the eye-pieces, will then see a spatial model of the image represented by the stereoscopic overlap reflected from the mirrors 68 and 69 through the semi-transparent mirrors 80 and 81 and then reflected up through the eye-pieces by the mirrors 39 and 40. The observer also sees, at the same time, the image of objects in the field of view of the silvered portions of the mirrors 80 and 81 reflected to the mirrors 39 and 40. In this latter field of view the floating mark 174 is brought. The spatial or stereoscopic model can be horizontalized in the usual manner by the use of basic reference points obtained from ground control, the adjustments being made by tipping and tilting the platens 118 with the thumb screws 150 and 151. Since errors due to variations in the positions of the camera in flight are generally caused by tilting and tipping of the camera about axes which are not in the plane of the photograph, the tipping and tilting movements of the platens must be complemented by shifting their positions in one or more coordinate directions to compensate for this difference.

In using the instrument for making planimetric maps, the floating mark 174 is moved to a position where it appears to the operator looking through the eye-pieces 37 and 38 to contact the surface of the spatial model at a point on the extreme end of a planimetric line, such as a drainage line, and the point of the pencil 175 is placed in contact with the mapping surface 31, upon which the instrument is supported. The tracing stand 161 is then moved so that the floating mark 174 follows the selected planimetric line of the model, the while continually changing the elevation of the floating mark by turning the thumb grip 173 to cause the floating mark to appear to contact the surface of the model at every point along the planimetric line traversed. When this traverse is completed, another planimetric line is selected for which the same procedure is followed. This is repeated for every desired planimetric line of the model to complete the map.

To use the instrument for making contour maps, the floating mark 174 is set at a height so that it appears to contact the model at a point on a selected contour elevation thereof, and the pencil 175 placed in contact with the mapping surface. The tracing stand is then moved so that the floating mark at its height setting constantly contacts the model at each change of position. In this manner the floating mark follows a line of constant elevation which is traced on the mapping surface with the pencil. When one contour line has been mapped, the height setting of the floating mark is changed by turning the thumb grip 173 to bring the floating mark to the next contour elevation desired, and the procedure is repeated. This is done for each contour elevation until the map is completed.

Figure 16:
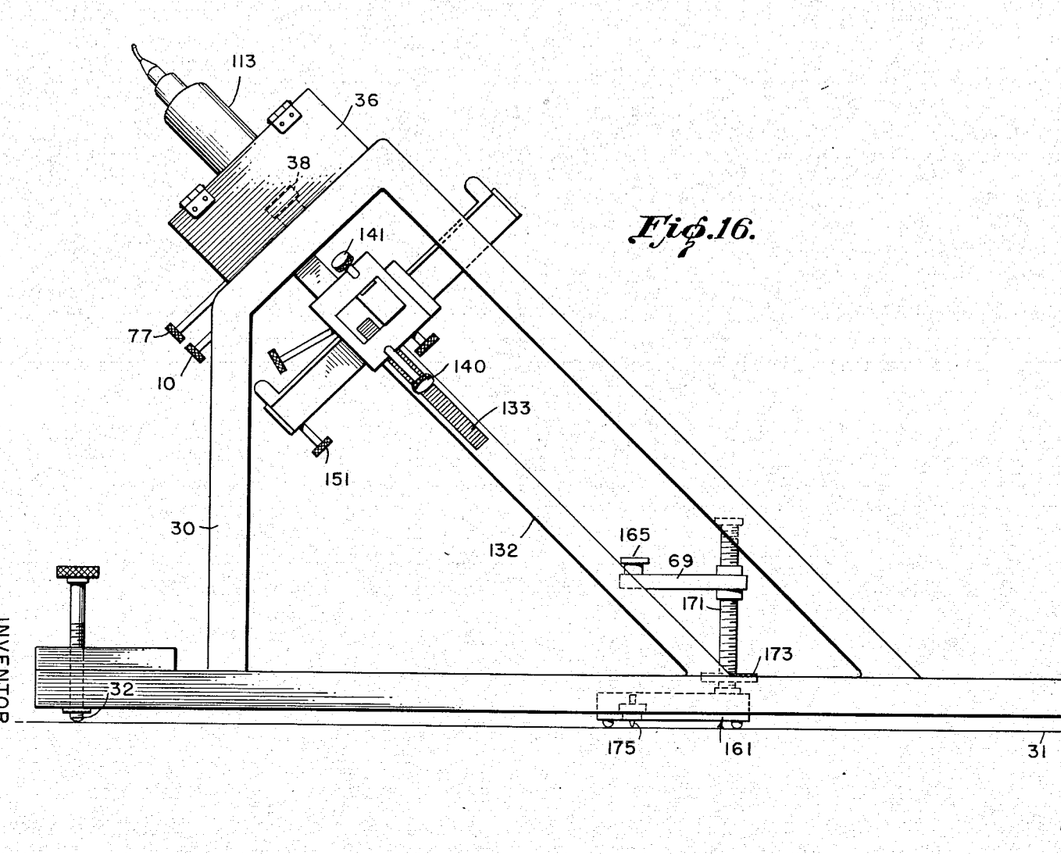
Figure 16 is a modified form of the invention for use with high oblique photographs.

In order to use this invention for making maps from high oblique photographs, that is, photographs which have been taken at a substantial angle to the vertical, such as around 45°, the instrument should be supported over the mapping surface so that the lines of sight of the stereoscope are in a plane at an angle approximating the angle of obliqueness. This may be accomplished by changing the structural frame, as illustrated in the end view of Figure 16, all other parts of the device being the same relative thereto. This arrangement places the tables for supporting the photographs normal to the approximate angle of obliqueness relative to which they can be moved in three coordinate directions.

Figure 17:
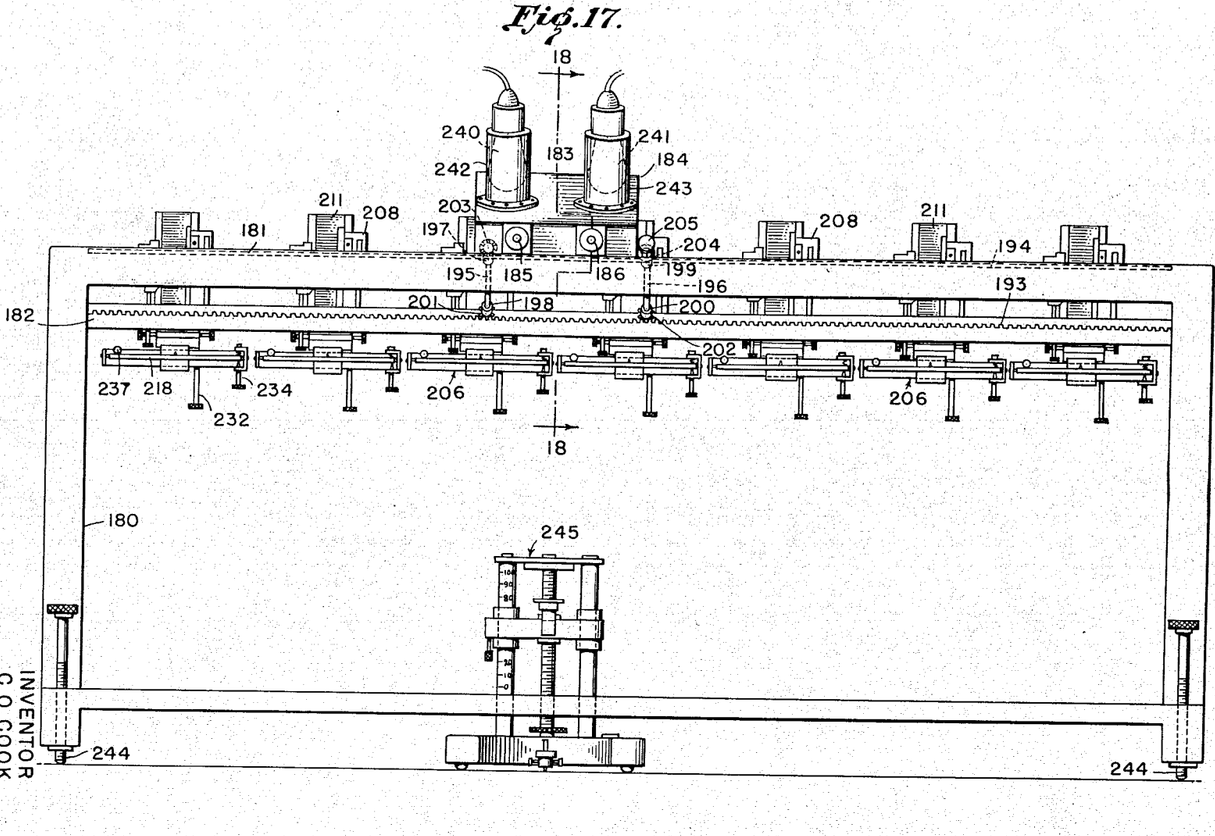
Figure 17 is a front elevational view of another modification of this invention.
Figure 18:
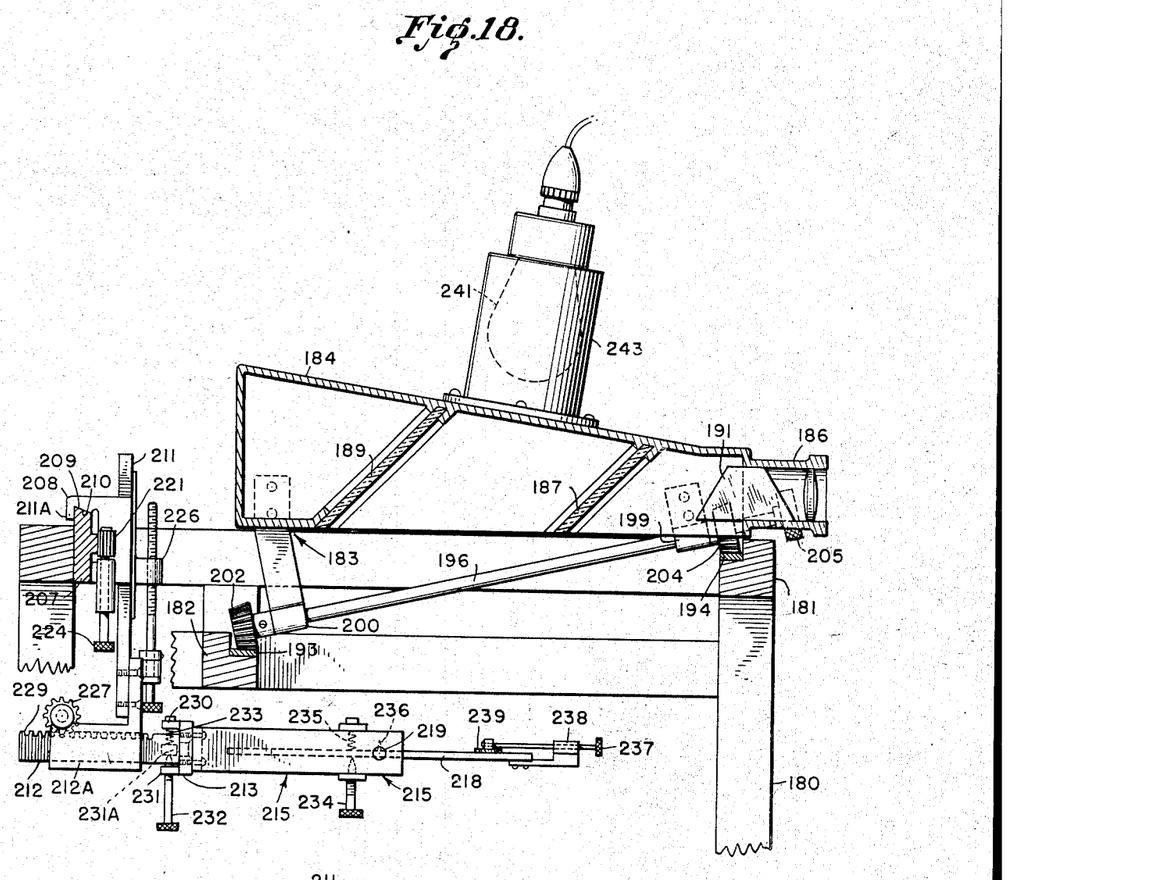
Figure 18 is a section along the line 18—18 of Figure 17.
Figure 19:
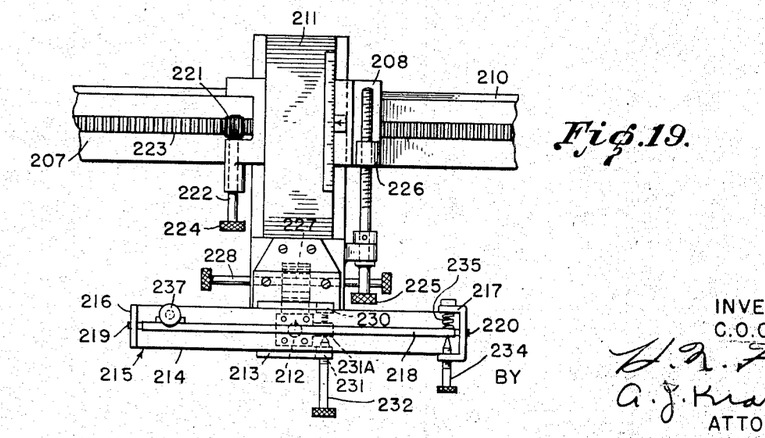
Figure 19 is an enlarged front elevational view of one of the phototables and supports.

A further modification of this invention illustrated in Figures 17, 18, and 19 permits the mounting of a series of consecutive overlapping photographs and means are provided for viewing any consecutive pair by shifting the optical system bodily thereover. This modification comprises a suitable frame structure 180 on the top of which there is secured longitudinal parallel bars 181 and 182, upon which there is slidably mounted a carriage 183 which supports a housing 184 for the optical system. This system comprises a pair of horizontal eye-pieces 185 and 186 through the front of the housing, a half-silvered or semi-transparent mirror 187 extending in front of both eye-pieces at an angle of approximately 45°, and another mirror 189 of the full reflecting type in front of and parallel to said half-silvered or semi-transparent mirror. Between the mirror 187 and each eye-piece 185 and 186, there are disposed inverting prisms, such as the prism 191. The carriage 183 is supported on racked tracks 193 and 194 on the bars 181 and 182 by means of shafts 195 and 196 rotatably mounted in bearings 197 and 198, and 199 and 200, respectively, on either side of the carriage. These shafts are provided with pinions 201 and 202 engaging the racked track 193 and pinions 203 and 204 engaging the track 194. One of said shafts, say the shaft 196, extends forward and is provided with a knob 205 to facilitate manual rotation thereof.

Below the carriage 183 there is mounted a row of tables 206 adjustable in three coordinate directions and also for tip and tilt as in the first embodiment illustrated. These tables are independently mounted on a longitudinal bar 207 by means of a removable sliding hanger 208, one for each table. Each hanger carries a shoulder 209 which rests on a bevel track 210 of the bar 207 and a lip 211A which engages the back of said bar 207. A vertical post 211 of non-circular cross-section is attached for vertical movement to each hanger 208. To the bottom of each post 211 there is attached for movement in a direction perpendicular to both the bar 207 and post 211 an arm 212 of non-circular cross-section, which arm operates in a sleeve 212A fixed to the bottom of the post 211. To the end of the post 211 a collar 213 is rotatably mounted. Secured to said collar 213 is the cross-arm 214 of a U-frame 215. Between the parallel arms 216 and 217 of said U-frame a platen 218 is pivotally mounted on trunnions 219 and 220.

Movement of the sliding hanger 208 on the bar 207 is accomplished by a pinion 221 fixed to the end of a shaft 222 rotatable on the hanger, which pinion engages a rack 223 extending throughout the length of the bar. This engagement serves as a third point of support for the hanger on the bar 207. A knob 224 for turning the shaft 222 is provided. Movement of the post 211 on the bracket 208 is controlled by a thumb screw 225 on the said post, threadedly engaging an ear 226 extending from the bracket 208. The arm 212 is moved relative to the post 211 by means of a pinion 227 fixed to a shaft 228 on the sleeve 212A which engages a rack 229 on the said arm. Rotation of the U-frame 215 on the collar 213 about the end of the arm 212 is accomplished by movement of projections 230 and 231 from said frame relative to a projection 231A from said arm, which movement is controlled by an abutment screw 232 against the force of an opposing spring 233. Similarly, the platen 218 is pivotally moved on its trunnions by means of an abutment screw 234 on the frame 215 against the force of an opposing spring 235.

The center of each platen 218 is provided with a short upright pin 236 for pivotally engaging a photograph, and, when so engaged, the photograph may be swung about the pin by means of a thumb screw 237 disposed in a non-radial position on a bracket 238 attached to the platen. The inner end of the thumb screw 237 carries a pad 239, like the pad 156 in the embodiment first described.

Photographs on the platens are illuminated by incandescent lamps 240 and 241 mounted in tubes 242 and 243 on the housing 184. The intensity of light from these lamps is independently controlled by rheostats (not shown), in a wiring system similar to that shown in Figure 15. The entire instrument is supported by adjustable legs 244 which, in use, rest on the mapping surface. A tracing stand 245 like the one described in the first embodiment is also used in connection with this embodiment.

Having thus described my invention, I claim:

1. A plotting instrument comprising a frame adapted to be supported on a horizontal mapping surface, tables supported by said frame for mounting stereoscopic pictures, means for tipping, tilting, and moving in three coordinate directions each of said tables with respect to said frame, a single reference mark below said tables movable over said mapping surface, and an optical system for viewing said pictures stereoscopically and for simultaneously viewing said reference mark.

2. A plotting instrument comprising a frame adapted to be supported on a horizontal mapping surface, tables supported by said frame for mounting stereoscopic pictures, means for tipping, tilting, and moving in three coordinate directions each of said tables with respect to said frame, means for pivotally turning said pictures on said tables, a single reference mark below said tables movable over said mapping surface, and an optical system for viewing said pictures stereoscopically and for simultaneously viewing said reference mark.

3. A plotting instrument comprising a frame adapted to be supported on a horizontal mapping surface, a row of tables supported by said frame for mounting a series of pictures which are related through stereoscopic overlaps, means for tipping, tilting, and moving in three coordinate directions each of said tables with respect to said frame, means for pivotally turning said pictures on said tables, a single reference mark below said tables movable over said mapping surface, a carriage movable over said tables, means on said frame for supporting said carriage, an optical system carried by said carriage for viewing consecutive pairs of said pictures and for simultaneously viewing said reference mark.

4. A plotting instrument comprising a frame adapted to be supported on a horizontal mapping surface, tables supported by said frame for mounting stereoscopic pictures, means for tipping, tilting, and moving in three coordinate directions each of said tables with respect to said frame, a single reference mark below said tables movable over said mapping surface, a stereoscope for viewing said pictures stereoscopically, and means associated with said stereoscope for simultaneously viewing said reference mark.

5. A plotting instrument comprising a frame adapted to be supported on a horizontal mapping surface, tables supported by said frame for mounting stereoscopic pictures, means for tipping, tilting, and moving in three coordinate directions each of said tables with respect to said frame, a single reference mark supported on and movable over said mapping surface, a stereoscope for viewing said pictures stereoscopically, and semi-transparent mirrors associated with said stereoscope for simultaneously viewing said reference mark.

6. A plotting instrument comprising a frame adapted to be supported on a horizontal mapping surface, tables supported by said frame for mounting stereoscopic pictures, means for tipping, tilting, and moving in three coordinate directions each of said tables with respect to said frame, a single reference mark supported on and movable over said mapping surface, a stereoscope for viewing said pictures stereoscopically, said stereoscope including eye-pieces, means for adjusting the relative positions of said eye-pieces to accommodate the eye bases of different observers, and means associated with the stereoscope for simultaneously viewing said reference mark.

7. An instrument for plotting maps from oblique photographs having a stereoscopic overlap comprising a frame adapted to be supported on a horizontal mapping surface, a stereoscope for viewing said pictures stereoscopically, said stereoscope being tilted at an angle to the plane of the mapping surface corresponding approximately to the angle of obliqueness of the photographs, tables for supporting said photographs in the field of view of said stereoscope, means for tipping and tilting said tables, means for moving said tables in three coordinate directions, and means associated with said stereoscope for simultaneously viewing a single floating mark over the mapping surface when the mark is between said tables and said mapping surface.

CHARLES O. COOK.